(12) United States Patent
Hoang et al.

(10) Patent No.: US 10,942,056 B2
(45) Date of Patent: Mar. 9, 2021

(54) TANK CONTINUOUS LEVEL SENSING BASED ON AVERAGE FLUSH VOLUME

(71) Applicant: B/E Aerospace, Inc., Winston Salem, NC (US)

(72) Inventors: Thao Hoang, Arlington, WA (US); Bradley J. Buniak, Woodinville, WA (US); Avinash Srikantegowda Hasirumane, Bothell, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 198 days.

(21) Appl. No.: 16/280,484

(22) Filed: Feb. 20, 2019

(65) Prior Publication Data
US 2020/0264028 A1 Aug. 20, 2020

(51) Int. Cl.
*G01F 23/20* (2006.01)
*G01F 23/00* (2006.01)

(52) U.S. Cl.
CPC .......... *G01F 23/20* (2013.01); *G01F 23/0069* (2013.01)

(58) Field of Classification Search
CPC ... G01F 23/0069; G01F 23/0076; G01F 23/20
See application file for complete search history.

(56) References Cited

U.S. PATENT DOCUMENTS

| | | | | |
|---|---|---|---|---|
| 4,201,085 A | * | 5/1980 | Larson | G01F 23/263 73/304 C |
| 5,090,242 A | * | 2/1992 | Hilton | G01F 23/168 73/302 |
| 5,133,212 A | * | 7/1992 | Grills et al. | G01F 23/0076 73/296 |
| 8,931,510 B2 | * | 1/2015 | Gaertner | B61D 35/007 137/572 |
| 10,760,937 B2 | * | 9/2020 | Bender | G01F 23/261 |
| 2001/0034902 A1 | * | 11/2001 | Tyler | B64D 11/02 4/321 |
| 2015/0191365 A1 | * | 7/2015 | Robb | C02F 9/005 210/741 |
| 2018/0364088 A1 | * | 12/2018 | Philipp | G01F 23/0069 |

* cited by examiner

*Primary Examiner* — Natalie Huls
(74) *Attorney, Agent, or Firm* — Suiter Swantz pc llo

(57) ABSTRACT

A system and method for continuous level sensing is disclosed. The system employs a continuous level sensing strain gauge measuring a weight of an aircraft waste tank, a lower and upper point level sensors to signal the system as the liquid level reaches each sensor, and a flush counter to correlate with the CLS and the PLS to determine an average flush volume (AFV). Once the AFV is known and updated, the system determines a weighted waste tank level based on a weighted addition of the flush count and the quantity as measured by the CLS. As the aircraft tank reaches a predetermined value, the system alerts a crewmember to the status.

20 Claims, 4 Drawing Sheets

US 10,942,056 B2

TANK CONTINUOUS LEVEL SENSING BASED ON AVERAGE FLUSH VOLUME

BACKGROUND

Accurately detecting the quantity of a liquid waste tank is a challenge within the industry. Challenges arise primarily due to the variances of different types of media present in a waste tank including but not limited to dense or fluffy waste paper, air bubbles, human waste of different densities, soap foams, coffee grounds, leftover food, etc. An inaccurate measurement of a waste tank level may lead to false positive indications as well as an unsanitary or dangerous leakage situation.

Installation procedures may lead to inaccurate measurement over time. Torque applied to an attachment point may lead to one or more attachment points adding an inaccurate force to a second attachment point. A standard aircraft waste tank may be limited to two invasive sensors. This limitation may ensure safety against additional opportunity for a fluid leak.

Therefore, a need remains for a system and related method which may overcome these limitations and establish an accurate and continuous liquid tank level without adding additional invasive level sensors. This system compensates for imperfect installation and allows liquid tank continuous level sensing output using the industry standard two invasive point level sensors.

SUMMARY

In one aspect, embodiments of the inventive concepts disclosed herein are directed to a system for tank continuous level sensing. The system may comprise a continuous level sensor (CLS) coupled with an aircraft waste tank, the CLS configured to measure a weight of the aircraft waste tank and an integrated system controller (ISC) having a processor operatively coupled with the ISC, the CLS operatively coupled with the ISC. The system may include a flush counter mechanically coupled with an aircraft lavatory flush valve and operatively coupled with the ISC.

For quantity measurement, the system may employ an upper point level sensor (PLS) mechanically coupled with the aircraft waste tank and operatively coupled with the ISC and a lower PLS mechanically coupled with the aircraft waste tank and operatively coupled with the ISC. For crew alert, the system may incorporate a crewmember indicator operatively coupled with the ISC and a tangible, non-transitory memory configured to communicate with the ISC and the processor, the tangible, non-transitory memory having instructions stored therein that, in response to execution by the ISC, cause the ISC to perform functions as directed by the system.

Such function may include set a first average flush volume based on a plurality of average flush volume inputs and receive a weight from the CLS. For accurate measurement, the system may receive an aircraft status and then determine a filtered waste tank level based on the weight and the aircraft status. As the tank fills, the system may receive a lower quantity input from the lower PLS and receive a first flush count from the flush counter. Once these inputs are received the system may correlate the first flush count with the lower quantity input to determine a second average flush volume. The system may determine a weighted waste tank level based on the filtered waste tank level, the second average flush volume, and the first flush count.

As the tank fills further, the system may receive an upper quantity input from the upper PLS and a second flush count from the flush counter. The system may correlate the second flush count with the upper quantity input to determine a third average flush volume. Once the third average flush volume is known, the system may update the weighted waste tank level based on the filtered waste tank level, the third average flush volume, and the second flush count, determine a max flush count to fill the waste tank, and alert a crewmember via the crewmember indicator if the weighted waste tank level reaches a predetermined value.

In a further aspect, embodiments of the inventive concepts disclosed herein are directed to a method for tank continuous level sensing. The method may comprise setting a first average flush volume based on a plurality of average flush volume inputs and receiving a lower quantity input from a lower Point Level Sensor (PLS) coupled with an aircraft waste tank. The method may include receiving a first flush count from a flush counter, correlating the first flush count with the lower quantity input to determine a second average flush volume, and determining a weighted waste tank level based on the second average flush volume and the first flush count.

The method may include receiving an upper quantity input from an upper PLS and a second flush count from the flush counter. The method may include correlating the second flush count with the upper quantity input to determine a third average flush volume and updating the weighted waste tank level based on the third average flush volume and the second flush count. The method may include determining a max flush count to fill the aircraft waste tank and alerting a crewmember via a crewmember indicator if the updated weighted waste tank level reaches a predetermined value.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
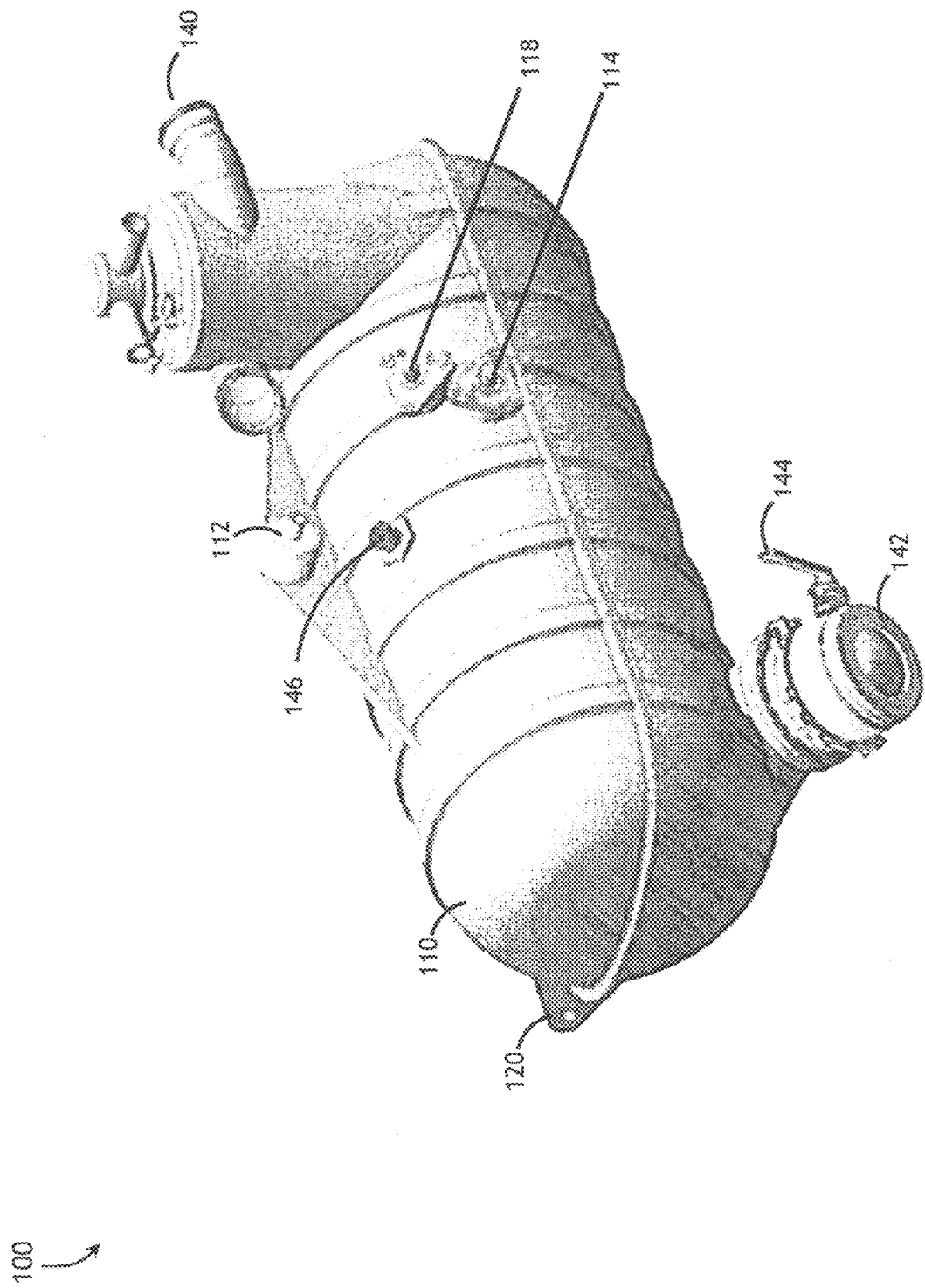
FIG. 1 is a diagram of an overview of a continuous level sensing waste tank in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and 'a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

OVERVIEW

Broadly, embodiments of the inventive concepts disclosed herein are directed to a system and method for continuous level sensing is disclosed. The system employs a continuous level sensing strain gauge measuring a weight of an aircraft waste tank, a lower and upper point level sensors to signal the system as the liquid level reaches each sensor, and a flush counter to correlate with the CLS and the PLS to determine an average flush volume (AFV). Once the AFV is known and updated, the system determines a weighted waste tank level based on a weighted addition of the flush count and the quantity as measured by the CLS. As the aircraft tank reaches a predetermined value, the system alerts a crewmember to the status.

| Reference Chart | |
|---|---|
| 100 | Waste Tank Overview |
| 110 | Aircraft Waste Tank |
| 112 | CLS Strain Gauge |
| 114 | Lower Point Level Sensor |
| 116 | Zero Point Sensor |
| 118 | Upper Point Level Sensor |
| 120 | Side Attachment Point |
| 140 | Tank Inlet |
| 142 | Tank Drain |
| 144 | Drain Valve |
| 146 | Rinse Port |
| 200 | System View |
| 214 | Lower Level Quantity |
| 216 | Mid Level Quantity |
| 218 | Upper Level Quantity |
| 220 | Vacuum Generator Controller |
| 222 | CAN Bus |
| 230 | Integrated System Controller |
| 232 | Zero Point Reset |
| 234 | ARINC 429 |
| 236 | Aircraft Status |
| 238 | Crew Indicator |
| 240 | Flush Counter |
| 242 | Waste Service Door |
| 300 | Logic Flow |
| 248 | Crew Reset |
| 302 | Receive Zero Point Reset |
| 304 | Set Average Flush Volume (AFV) |
| 306 | Receive Lower Sensor Signal |
| 308 | Correlate Flush Count with Lower Sensor Quantity |
| 310 | Receive Upper Sensor Signal |
| 312 | Correlate Flush Count with Upper Sensor Quantity |
| 314 | Determine Flushes to Full |
| 316 | Approaching Full? |
| 318 | Alert Crew |
| 320 | Receive CLS Signal |
| 322 | Receive A/C Status |
| 324 | Determine FWTL |
| 326 | Flush Count Value |
| 328 | Determine WWTL <50% |
| 330 | Determine WWTL >50% |
| 332 | Send WWTL to Gauge |
| 340 | Count Flushes |
| 342 | Update AFV |
| 350 | AFV inputs |
| 400 | Method Flow |
| 402 | Set First AFV |
| 404 | Receive Lower PLS |
| 406 | Receive First Flush Count |
| 408 | Determine Second AFV |
| 410 | Determine WWTL |
| 412 | Receive Upper PLS |
| 414 | Receive Second Flush Count |
| 416 | Determine Third AFV |
| 418 | Update the WWTL |
| 420 | Determine Max Flush Count |
| 422 | Alert Crew when near Full |

FIG. 1

Referring to FIG. 1, a diagram of an overview of a continuous level sensing waste tank in accordance with an embodiment of the inventive concepts disclosed herein is shown. An aircraft waste tank 110 may include a plurality of components. To couple with the host aircraft, a side attachment point 120 may operate only as attachment point while the Continuous Level Sensor (CLS) 112 may function both as a coupling with the host aircraft as well as a strain gauge to measure a weight of the aircraft waste tank 110. An inlet 140, a rinse port 146, and tank drain 142 with associated drain valve 144 may function as fluid ports for the aircraft waste tank 110.

A lower 114 and upper 118 Point Level Sensor (PLS) may be sited at various measuring points and configured to send a binary signal as the internal fluid physically reaches the individual PLS. In one example, the lower PLS 114 may be sited at 20% of full and the upper PLS 116 may be sited at 80% full. Selection of 20% and 80% points maybe adjusted to any values may function accurately when at least one PLS is above 50% and at least one PLS is below 50%.

In one embodiment of the inventive concepts disclosed herein, the aircraft waste tank 110 may function onboard and aircraft. However, contemplated herein, the inventive concepts described herein may apply to a waste tank on any moving vehicle which may include a waste tank and a flush apparatus.

Also, a plurality of sizes of aircraft waste tank 110 and PLS locations may function within the scope of the inventive concepts disclosed herein. The inventive concepts herein may directly apply to a smaller aircraft waste tank mounted on a A-320 as well as a larger aircraft waste tank 110 mounted on an A-380.

FIG. 2

Figure 2:
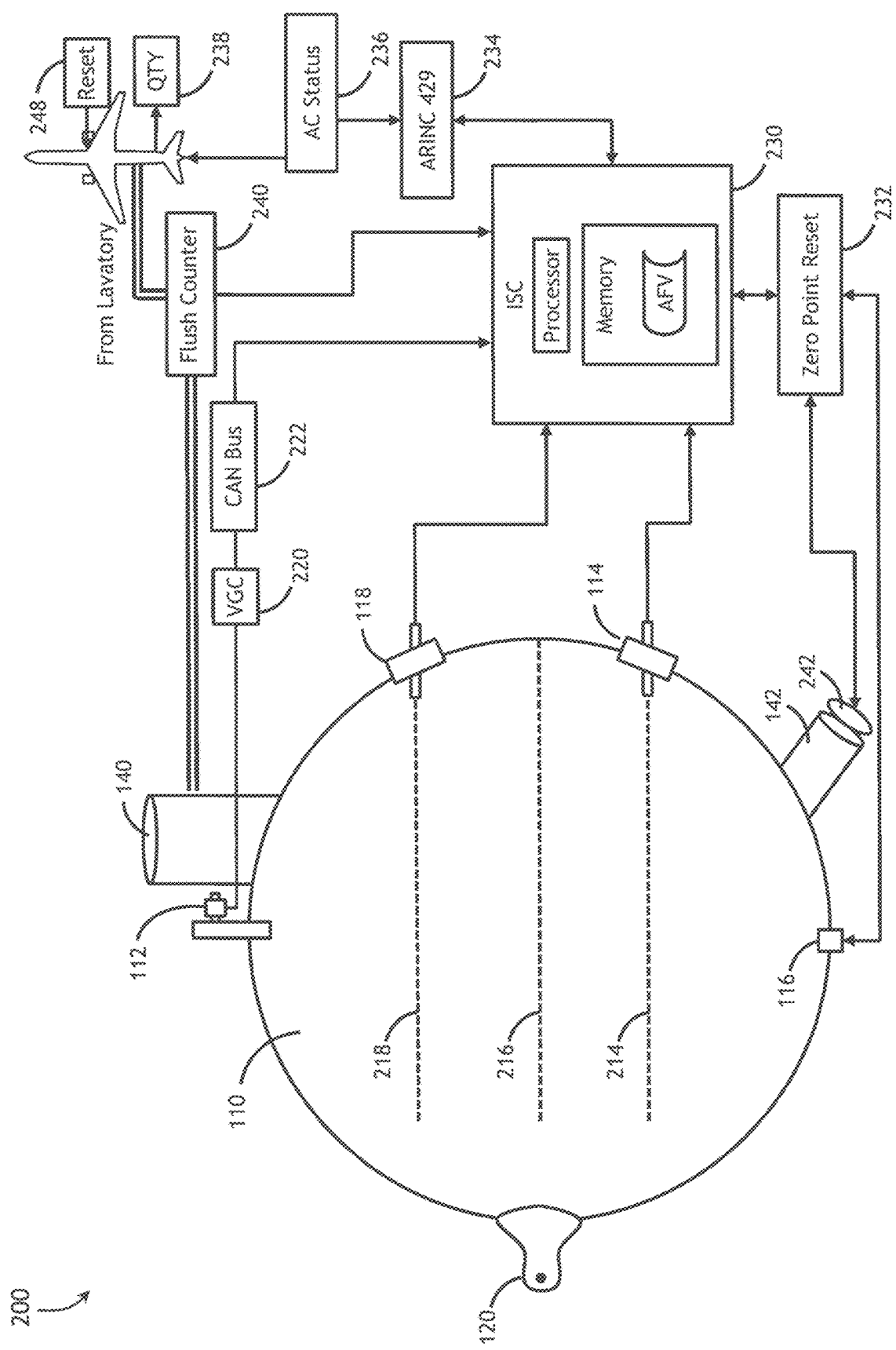
FIG. 2 is a diagram of a system for continuous level sensing in accordance with an embodiment of the inventive concepts disclosed herein.

Referring now to FIG. 2, a diagram of a system for continuous level sensing in accordance with an embodiment of the inventive concepts disclosed herein is shown. The system for CLS 200 may include the CLS 112 mechanically coupled with the host aircraft attachment as well as with the aircraft waste tank 110. Here, the CLS may be embodied as a strain gauge and configured to measure a weight of the aircraft waste tank. The CLS 112 may send an analog signal to a Vacuum Generator Controller (VGC) 220 which may modify the signal and relay to the ISC 230 via a Controller Area Network (CAN) bus 222. In one embodiment, a frequency of the CAN bus input from the CLS 112 may be between 1000 to 11000 Hz.

To control function of the system for CLS 200, an integrated system controller (ISC) 230 having a processor operatively coupled with the ISC 230 may be employed. Here the CLS 112 may operatively couple with the ISC 230.

To count each flush, the system 200 may employ a flush counter 240 mechanically coupled with an aircraft lavatory flush valve and operatively coupled with the ISC 230. Each flush from each onboard lavatory may increase the flush counter by one.

Additional inputs to the ISC 230 may include an aircraft (AC) status 236 including current attitude comprising a pitch, a roll, and a yaw of the aircraft. In addition, the AC status 236 may include each current acceleration experienced by the aircraft including a lateral, a longitudinal, and a vertical acceleration.

A communication network such as an ARINC 429 standard 234 may allow the ISC 230 to communicate in a standardized manner with the host aircraft. The ISC 230 may use the aircraft status 236 coupled with the CLS 112 input to calculate a Waste Tank Level Percentage, and then employ a first-order lag filter with a k value of 0.875 to filter the calculated Waste Tank Level Percentage. Due to inherent motion of the host aircraft, this filter may equate to approximately two minutes of filtering before the Waste Tank Level Percentage reaches the new value. At this point, the system may calculate a fairly accurate Waste Tank Level Percentage. However, imperfect tank installation may skew the CLS 112 readings and create errors. The system 200 may counteract any error in tank installation via calculation of a Weighted Waste Tank Level.

A zero point reset 232 command may indicate to the ISC 230 that the aircraft waste tank 110 is indeed empty and compensate for any imperfect tank installation. Possible inputs to the zero point reset 232 may include a signal from a zero point sensor 116, a switch activated by a crewmember via a crew reset 248, as well as from the lavatory waste service door 242 as actuated by a ground crewmember. An additional embodiment may include a zero point reset 232 via actuation of a flush valve for a specific period. In this manner, an operator may indicate to the ISC 230 an absolute zero status of the aircraft waste tank 110.

The zero point reset 232 function may cause a plurality of actions. It may reset the flush counter to zero as well as reset an average flush volume (AFV) to a default value. In one embodiment of the inventive concepts disclosed herein, a factory default zero point weight may be the actual weight of the aircraft waste tank 110, tank drain 142 and drain valve 144. However, this factory weight may be inaccurate at the CLS 112 by an amount of torque applied to each attachment point 120 and alignment of the tank within the host aircraft.

The zero point reset 232 may allow the operator to install the tank with the waste service door 242 open while on the ground, and then actuate each high volume flush switch for an exemplary 10 seconds. The flush valve may then open and close to signal the operator that the ISC 230 has entered the zero point reset 232. When the CLS 112 reading is ready to be used, the operator may close the waste service door 242 at which time the ISC 230 may reset the zero point weight based on the CLS 112 reading at the time of the waste service door 242 is closed. Also, during a time when the waste service door 242 is open, the aircraft at rest where acceleration inputs may be zero however there may be some slight pitch roll and yaw in the aircraft waste tank 110 from a slightly inaccurate installation.

In one embodiment of the inventive concepts disclosed herein, one of the zero point reset 232 switch methods may reset the AFV to the default value and another switch activation sequence may may reset the zero level of the waste tank quantity. Contemplated herein, each specific operator may request a specific type of switch activation for a crewmember to interact with the ISC 230. A plurality of options available using flush valves, reset switches, door sensors, and the like may offer a crewmember interaction with the ISC 230.

One limit to the zero point reset may include a maximum and minimum CLS 112 reading. Should the CLS 112 reading maintain within a range of 2000 Hz to 4000 Hz, the ISC 230 may output 110% for 5 minutes to the host aircraft via ARINC 429 236 if the zero point weight was successfully reset. If not, the ISC may return to the factory default zero point weight and the ISC 230 may output 255% for 5 minutes to the host aircraft via ARINC 429 236 to indicate to the operator to repeat the process. This procedure may allow for the tank installation to have minimal to no effect on the accuracy of the waste tank level, and may allow more accurate quantity measurements.

As above, each of the upper PLS 118 and lower PLS 114 may mechanically couple with the aircraft waste tank 110 as well as operatively coupled with the ISC 230. The zero point sensor 116 may be sited at the tank bottom and may indicate to the ISC 230 a tank empty status. As the aircraft waste tank 110 fills, the lower PLS 114 may indicate to the ISC 230 that a fluid level 214 has reached the lower PLS 114. As the fluid level reaches a mid level 216, the only sensor to signal the ISC 230 is still the lower PLS 114. As the fluid level 218 reaches the upper PLS 118, the upper PLS 118 sends the ISC the signal of that status.

For alerting a crew, a crewmember indicator 238 may be operatively coupled with the ISC 230 and in a location (e.g., a galley) where a crewmember may view. Within the ISC 230, a tangible, non-transitory memory configured to communicate with the ISC and the processor, the tangible, non-transitory memory having instructions stored therein that, in response to execution by the ISC 230, cause the ISC to perform a plurality of functions associated with the system for CLS 200. Within the memory, the AFV may be stored for a current flight segment as well as a default AFV from historical flight segments.

The ISC 230 may function to reset, calculate, and update the AFV. A default (first) AFV may be generated by the ISC 230 as a function of a plurality of inputs to determine a default AFV. Also, as the ISC 230 commands a zero point reset 232, it sets the AFV to the default value. As the waste tank fills from each flush, the ISC 230 may receive an input from the flush counter 240 and may count each flush. When the fluid level of the waste tank reaches the lower PLS 114, the ISC 230 recalculates the AFV based on the known amount of fluid in the aircraft waste tank 110 at the lower PLS 114. In this manner, the ISC 230 may determine an exact number of flushes required to reach the fluid level 214 at the lower PLS 114 and therefore, calculate the AFV.

For example, as the fluid in the aircraft waste tank 110 reaches the lower PLS 114, the volume in the waste tank at the lower PLS level 214 may be 35 gallons. To reach this level, the ICS 230 received a flush count of 73 flushes. In this example, the ISC 230 may calculate the second AFV at 0.479 gallons.

FIG. 3

Figure 3:
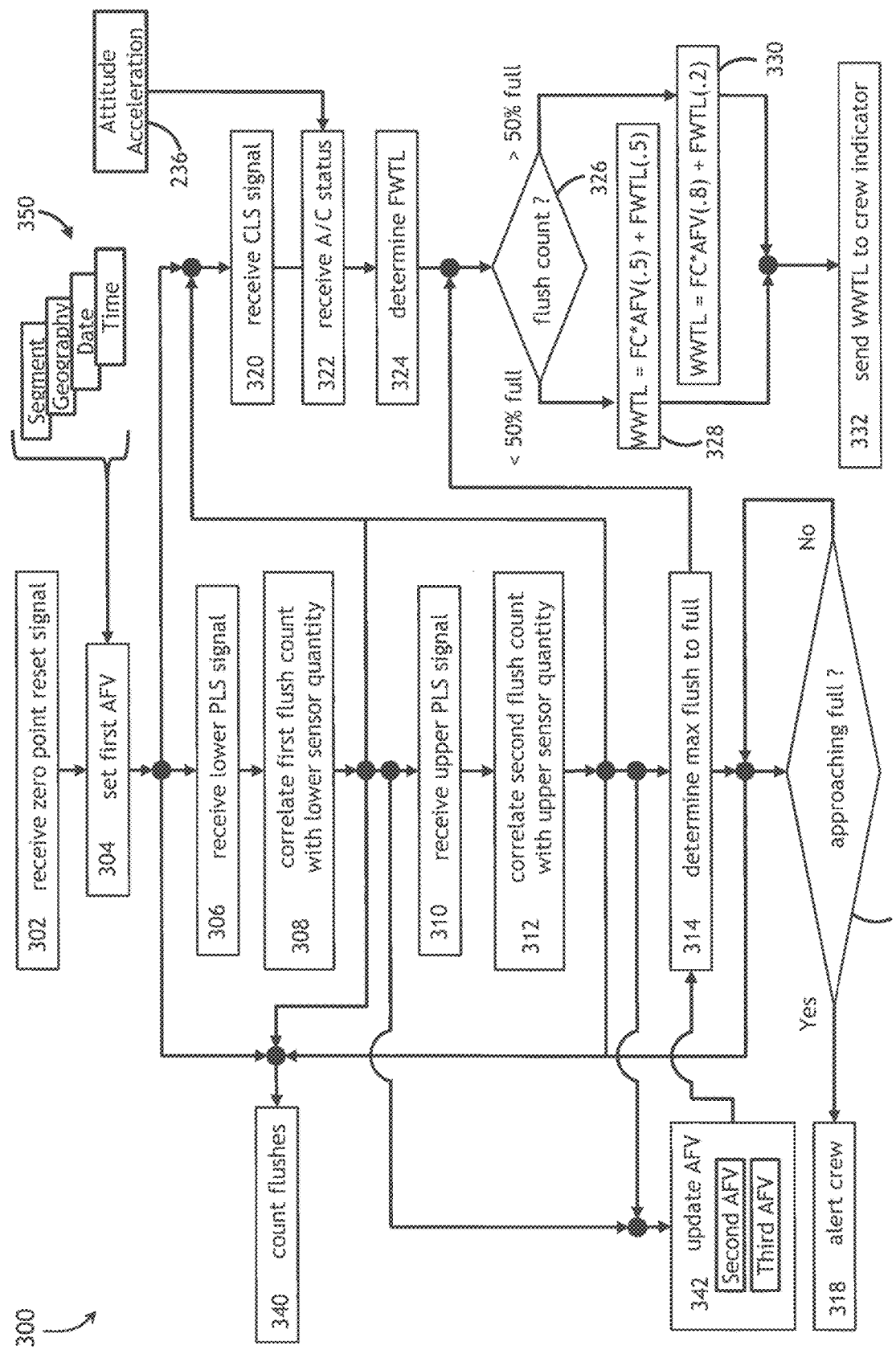
FIG. 3 is a logic diagram of a system for continuous level sensing exemplary of an embodiment of the inventive concepts disclosed herein.

Referring now to FIG. 3, a logic diagram of a system for continuous level sensing exemplary of an embodiment of the inventive concepts disclosed herein is shown. The logic flow 300 may include illustrative steps for determining a most accurate Weighted Waste Tank Level (WWTL) and displaying the WWTL to a crewmember.

A step 302 may include receiving a zero point reset signal to ensure the aircraft waste tank 110 is empty. A step 304 may set a default or first AFV volume based on a plurality of average flush volume inputs 350. AFV inputs 350 may include an average over an exemplary recent five flight segments, a geography input, a date and time input. For example, during a daytime flight, the default AFV may be higher than during a night flight. Also, a flight originating in a particular part of the world may have a higher historical AFV than another part of the world.

After a step 304 the logic may flow in both directions to begin to count flushes at a step 340 and to receive the optional CLS input at a step 320.

An optional step 320 may receive a weight from the CLS strain gauge. As above, the system for CLS may function at a level of accuracy with an inoperative or unresponsive CLS 112. A step 322 may receive an aircraft status and a step 324 may determine a filtered waste tank level based on the weight and the aircraft status. Here, the ISC 230 may account for the pitch roll and yaw as well as each acceleration associated with the host aircraft in determining the filtered waste tank level. As above, the filtered waste tank level may be a time delayed measurement of the CLS strain gauge reading.

For a volume based quantity determination, a step 306 may receive a lower PLS signal from the lower PLS 114 indicating to the ISC 230 that the lower PLS is wet. During the time from the zero point reset to the lower PLS signal the system has been counting flushes where ISC 230 may receive a first flush count from the flush counter. A step 306 may correlate the first flush count with the lower quantity input to determine, at a step 342, a second average flush volume. Here the second AFV may be the initial AFV calculated based on actual volume measurement via the lower PLS 114.

A query at a step 326 may question whether the first flush count multiplied by the second AFV has reached a 50% full volume. If not, a step 328 may determine a WWTL based on a formula of half the volume measurement (first flush count*AFV) plus half the CLS calculation (WWTL), In this manner, when the aircraft waste tank is less than half full, each of the inputs are given equal weight (50%) in determining the WWTL.

The system may continue to count flushes as the logic returns to the step 340. As the volume increases to reach the upper PLS 118, the ISC 230 may receive an upper quantity input from the upper PLS at a step 310 and receive a second flush count from the flush counter. The logic flow may continue at a step 312 with correlate the second flush count with the upper quantity input to determine a third average flush volume at the step 342. Here the third average flush volume may build on the accuracy of the second and first (default) AFV. The logic may then update, at a step 330, the WWTL based on the filtered waste tank level, the third average flush volume, and the second flush count. Here, as the flush count may indicate the aircraft waste tank 110 is greater than 50% full, the WWTL may be a sum of two tenths of the FWTL plus eight tenths of the volume measurement (FC*3rd AFV). In this manner, the flush count and the third AFV are given greater weight to determine a more accurate aircraft waste tank volume. A step 332 may continuously send the updated WWTL to the crew indicator 238.

A step 34 may determine a max flush count to fill the waste tank and a query 316 may determine if the weighted waste tank level reaches a predetermined value. For example, should the flush count multiplied by the third AFV indicate the aircraft waste tank 110 is 95% full, the logic may pass to a step 318 with alert a crewmember via the crewmember indicator. Contemplated herein, the crewmember indicator may include a gauge and a warning light.

In one embodiment of the inventive concepts disclosed herein, the ISC 230 may function with no or an inoperative CLS 112. In this manner, the ISC 230 may calculate the WWTL based solely on a flush count multiplied by the updated AFV.

FIG. 4

Figure 4:
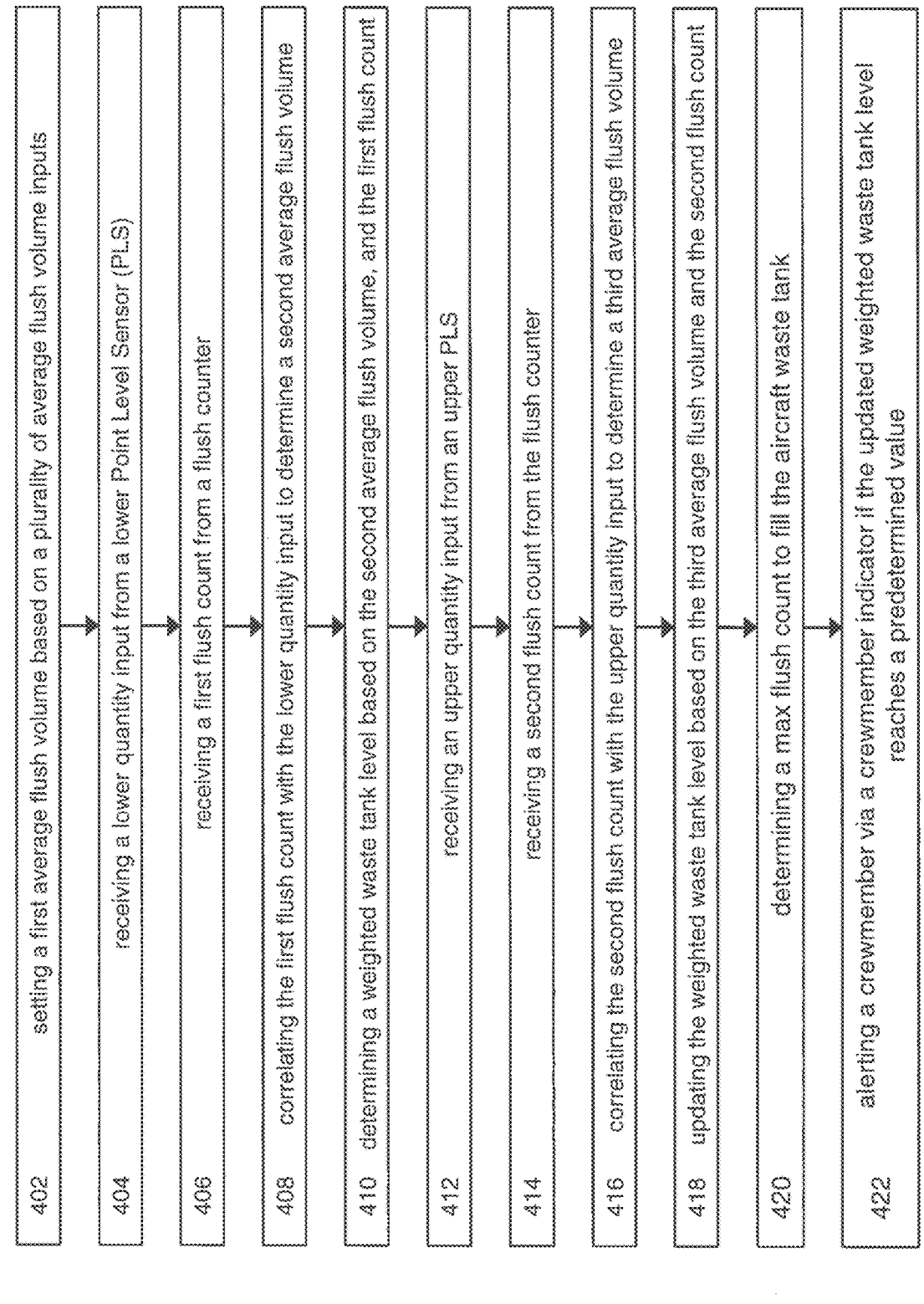
FIG. 4 is a method flow diagram for continuous level sensing exemplary of one embodiment of the inventive concepts disclosed herein.

Referring now to FIG. 4, a method flow diagram for continuous level sensing exemplary of one embodiment of the inventive concepts disclosed herein is shown. A method 400 for CLS may include a step 402 with setting a first average flush volume based on a plurality of average flush volume inputs and a step 404 receiving a lower quantity input from a lower Point Level Sensor (PLS) coupled with an aircraft waste tank. A step 406 may include receiving a first flush count from a flush counter and a step 408 may correlate the first flush count with the lower quantity input to determine a second average flush volume.

A step 410 may include determining a WWTL based on the second AFV and the first flush count. As the tank fills, the method may, at a step 412, receive an upper quantity input from an upper PLS and a second flush count from the flush counter at a step 414. A step 416 may include correlating the second flush count with the upper quantity input to determine a third average flush volume while a step 418 may update the weighted waste tank level based on the third average flush volume and the second flush count.

A step 420 may include determining a max flush count to fill the aircraft waste tank and a step 422 may include alerting a crewmember via a crewmember indicator if the updated weighted waste tank level reaches a predetermined value.

CONCLUSION

As will be appreciated from the above description, embodiments of the inventive concepts disclosed herein may establish an accurate and continuous liquid tank level without adding additional invasive level sensors. This system compensates for imperfect installation and allows liquid tank continuous level sensing output using the industry standard two invasive point level sensors.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for tank continuous level sensing, comprising:
    a continuous level sensor (CLS) coupled with an aircraft waste tank, the CLS configured to measure a weight of the aircraft waste tank;
    an integrated system controller (ISC) having a processor operatively coupled with the ISC, the CLS operatively coupled with the ISC;
    a flush counter mechanically coupled with an aircraft lavatory flush valve and operatively coupled with the ISC;
    an upper point level sensor (PLS) mechanically coupled with the aircraft waste tank and operatively coupled with the ISC;
    a lower PLS mechanically coupled with the aircraft waste tank and operatively coupled with the ISC;
    a crewmember indicator operatively coupled with the ISC;
    a tangible, non-transitory memory configured to communicate with the ISC and the processor, the tangible, non-transitory memory having instructions stored therein that, in response to execution by the ISC, cause the ISC to:
    set a first average flush volume based on a plurality of average flush volume inputs;
    receive a weight from the CLS;
    receive an aircraft status;
    determine a filtered waste tank level based on the weight and the aircraft status;
    receive a lower quantity input from the lower PLS;
    receive a first flush count from the flush counter;
    correlate the first flush count with the lower quantity input to determine a second average flush volume;
    determine a weighted waste tank level based on the filtered waste tank level, the second average flush volume, and the first flush count;
    receive an upper quantity input from the upper PLS;
    receive a second flush count from the flush counter;
    correlate the second flush count with the upper quantity input to determine a third average flush volume;
    update the weighted waste tank level based on the filtered waste tank level, the third average flush volume, and the second flush count;
    determine a max flush count to fill the waste tank;
    alert a crewmember via the crewmember indicator if the weighted waste tank level reaches a predetermined value.

2. The system for tank continuous level sensing of claim 1, further including a zeroization of each of the flush count and the weighted waste tank level based on a user zero point reset signal.

3. The system for tank continuous level sensing of claim 2, wherein the user zero point reset signal is triggered by one of: a closing of an aircraft lavatory service door and a 10 second actuation of a flush handle.

4. The system for tank continuous level sensing of claim 1, wherein the predetermined value equals 95% of full.

5. The system for tank continuous level sensing of claim 1, wherein the lower PLS is at 20% of a physical full level and the upper PLS is at 80% of the physical full level.

6. The system for tank continuous level sensing of claim 1, wherein the plurality of average flush volume inputs further comprises a flight segment, a departure, a destination, a date and a time.

7. The system for tank continuous level sensing of claim 1, wherein the aircraft status further comprises a pitch, a roll, a yaw, a vertical acceleration, a lateral acceleration, and a longitudinal acceleration.

8. The system for tank continuous level sensing of claim 1, wherein determine a filtered waste tank level further comprises a first order lag filter with a k value of 0.875.

9. The system for tank continuous level sensing of claim 1, wherein determine a weighted waste tank level further comprises an addition of one-half of the flush count times average flush volume plus one half of the filtered waste tank level if the flush count is less than one half of the max flush count.

10. The system for tank continuous level sensing of claim 1, wherein determine a weighted waste tank level further comprises an addition of eight tenths of the flush count times average flush volume plus two tenths of the filtered waste tank level if the flush count is greater than one half of the max flush count.

11. The system for tank continuous level sensing of claim 1, wherein the crewmember indicator is one of a gauge and a warning light.

12. The system for tank continuous level sensing of claim 1, wherein receive an aircraft status and alert a crewmember further comprises a communication via an ARINC 429 standard network.

13. The system for tank continuous level sensing of claim 1, wherein receive the lower and upper quantity input further comprises a communication via a controller area network (CAN bus) network.

14. The system for tank continuous level sensing of claim 1, wherein an output from the CLS is an analog input to a Vacuum Generator Controller (VGC), the VGC configured for conversion of the CLS output to a frequency between 1000 and 11000 Hz.

15. A method for tank continuous level sensing, comprising:
setting a first average flush volume based on a plurality of average flush volume inputs;
receiving a lower quantity input from a lower Point Level Sensor (PLS) coupled with an aircraft waste tank;
receiving a first flush count from a flush counter;
correlating the first flush count with the lower quantity input to determine a second average flush volume;
determining a weighted waste tank level based on the second average flush volume and the first flush count;
receiving an upper quantity input from an upper PLS;
receiving a second flush count from the flush counter;
correlating the second flush count with the upper quantity input to determine a third average flush volume;
updating the weighted waste tank level based on the third average flush volume and the second flush count;
determining a max flush count to fill the aircraft waste tank;
alerting a crewmember via a crewmember indicator if the updated weighted waste tank level reaches a predetermined value.

16. The method for tank continuous level sensing of claim 15, further including:
receiving a weight from a Continuous Level Sensor (CLS), the CLS coupled with an aircraft waste tank;
receiving an aircraft status;
determining a filtered waste tank level based on the weight and the aircraft status;
updating the weighted waste tank level based on the filtered waste tank level, the third average flush volume, and the second flush count.

17. The method for tank continuous level sensing of claim 15, further including sending a user zero point reset signal to zeroize each of the flush count and the weighted waste tank level.

18. The system for tank continuous level sensing of claim 17, wherein the user zero point reset signal is triggered by one of: a closing of an aircraft lavatory service door and a 10 second actuation of a flush handle.

19. The method for tank continuous level sensing of claim 16, wherein determining a weighted waste tank level further comprises adding one-half of the flush count times average flush volume plus one half of the filtered waste tank level if the flush count is less than one half of the max flush count.

20. The method for tank continuous level sensing of claim 16, wherein determining a weighted waste tank level further comprises adding eight tenths of the flush count times average flush volume plus two tenths of the filtered waste tank level if the flush count is greater than one half of the max flush count.

\* \* \* \* \*